US012691767B2

(12) United States Patent
        Kuno

(10) Patent No.:    US 12,691,767 B2
(45) Date of Patent:         Jul. 28, 2026

(54) VEHICLE

(71) Applicant: TOYOTA JIDOSHA KABUSHIKI KAISHA, Toyota (JP)

(72) Inventor: Atsunori Kuno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 317 days.

(21) Appl. No.: 18/494,083

(22) Filed: Oct. 25, 2023

(65) Prior Publication Data

US 2024/0227583 A1     Jul. 11, 2024

(30) Foreign Application Priority Data

Jan. 11, 2023    (JP) ................................. 2023-002661

(51) Int. Cl.
  B60L 50/60       (2019.01)
  B60K 1/04        (2019.01)
  B60R 16/02       (2006.01)
  B60R 16/04       (2006.01)
  B62D 25/20       (2006.01)
              (Continued)

(52) U.S. Cl.
  CPC .......... B60L 50/66 (2019.02); B60R 16/0215 (2013.01); B60R 16/0222 (2013.01); B60K 2001/0438 (2013.01); B60K 2001/0472 (2013.01); B60R 16/04 (2013.01); B62D 25/20 (2013.01); H01M 50/209 (2021.01); H01M 50/242 (2021.01); H01M 50/249 (2021.01); H01M 50/298 (2021.01)

(58) Field of Classification Search
  CPC ........... B60R 16/0207; B60R 16/0215; B60R 16/0222; B60R 16/04; B60L 50/60; B60L 50/64; B60L 50/66; B60K 2001/0438; B60K 2001/0472; B62D 25/20; H01M 50/242; H01M 50/289–293; H01M 50/298
  See application file for complete search history.

(56) References Cited

U.S. PATENT DOCUMENTS 9,216,638 B2 * 12/2015 Katayama ............... B60L 50/52
11,766,924 B2 * 9/2023 Yanagida ............ B60R 16/0207
                                                          307/10.1
              (Continued)

FOREIGN PATENT DOCUMENTS

JP        2000344026 A  * 12/2000
JP        2015182655 A  * 10/2015
              (Continued)

*Primary Examiner* — James J Taylor, II
(74) *Attorney, Agent, or Firm* — SoraIP, Inc.

(57)                    ABSTRACT
A vehicle includes a battery case, a frame member, and a wire harness. The battery case includes an upper case and a lower case and houses a battery. The frame member faces the upper case. The upper case includes a first case-side portion. The frame member includes a first frame-side portion that faces the first case-side portion. The wire harness is disposed so as to pass through a gap between the first case-side portion and the first frame-side portion, and includes a covering portion made of an elastic member that covers an outer circumference of the wire harness. The covering portion is in contact with the first case-side portion and the first frame-side portion, and is sandwiched between the first case-side portion and the first frame-side portion.

3 Claims, 6 Drawing Sheets

(51) Int. Cl.
    *H01M 50/209*     (2021.01)
    *H01M 50/242*     (2021.01)
    *H01M 50/249*     (2021.01)
    *H01M 50/298*     (2021.01)

(56)             References Cited

U.S. PATENT DOCUMENTS

| | | | | |
|---|---|---|---|---|
| 11,827,164 | B2 * | 11/2023 | Yamaguchi | B60K 1/04 |
| 11,932,124 | B2 * | 3/2024 | Kawase | B60L 50/66 |
| 2020/0227706 | A1 | 7/2020 | Kuno | |
| 2021/0221239 | A1 * | 7/2021 | Kawase | B60L 50/66 |
| 2022/0209351 | A1 * | 6/2022 | Lee | H01M 50/505 |

FOREIGN PATENT DOCUMENTS

| | | | |
|---|---|---|---|
| JP | 2019-129042 | A | 8/2019 |
| JP | 2020-113528 | A | 7/2020 |
| JP | 2022-187710 | A | 12/2022 |

* cited by examiner

UPR

Fr

1

10

VEHICLE

CROSS-REFERENCE TO RELATED APPLICATION

This application claims priority to Japanese Patent Application No. 2023-002661 filed on Jan. 11, 2023, incorporated herein by reference in its entirety.

BACKGROUND

1. Technical Field

The present disclosure relates to a vehicle equipped with a battery pack.

2. Description of Related Art

Japanese Unexamined Patent Application Publication No. 2020-113528 (JP 2020-113528 A) discloses a vehicle equipped with a battery pack. In the vehicle, cables are arranged inside an upper case of the battery pack. Further, an elastic member is disposed so as to be interposed between the upper case and a floor panel of the vehicle for vibration isolation of the upper case.

SUMMARY

In the vehicle described in JP 2020-113528 A, the cables (wire harness) are arranged inside a battery case including the upper case. Therefore, in the vehicle, it is necessary to separately establish a wiring structure of the wire harness and a vibration isolation structure of the upper case. As a result, more space is secured to be compatible with the structures.

The present disclosure has been made in view of the problems as described above, and an object of the present disclosure is to provide a vehicle that achieves both a wiring structure of a wire harness and a vibration isolation structure of an upper case while saving space.

A vehicle according to the present disclosure includes a battery case, a frame member, and a wire harness. The battery case includes an upper case and a lower case and houses a battery. The frame member faces the upper case. The upper case includes a first case-side portion. The frame member includes a first frame-side portion that faces the first case-side portion. The wire harness is disposed so as to pass through a gap between the first case-side portion and the first frame-side portion, and includes a covering portion made of an elastic member that covers an outer circumference of the wire harness. The covering portion is in contact with the first case-side portion and the first frame-side portion, and is sandwiched between the first case-side portion and the first frame-side portion.

The vehicle may further include a damper member. The upper case may include a second case-side portion protruding toward the frame member. The frame member may include a second frame-side portion that faces the second case-side portion and protrudes toward the upper case. The damper member may be in contact with each of the second case-side portion and the second frame-side portion, and is sandwiched between the second case-side portion and the second frame-side portion.

The battery case may include a plurality of support portions that is disposed between the upper case and the lower case and that supports the upper case. The support portions may include a first support portion that supports the first case-side portion, and a second support portion that supports the second case-side portion, unlike the first support portion.

With the vehicle according to the present disclosure, it is possible to achieve both the wiring structure of the wire harness and the vibration isolation structure of the upper case while saving space.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described with accompanying drawings. Elements common to each figure are given the same reference signs, and overlapping descriptions are omitted or simplified.

1. Basic Structure for Battery Pack Installation

Figure 1:
FIG. 1 is a diagram for explaining an example of a vehicle according to an embodiment.
Figure 1:
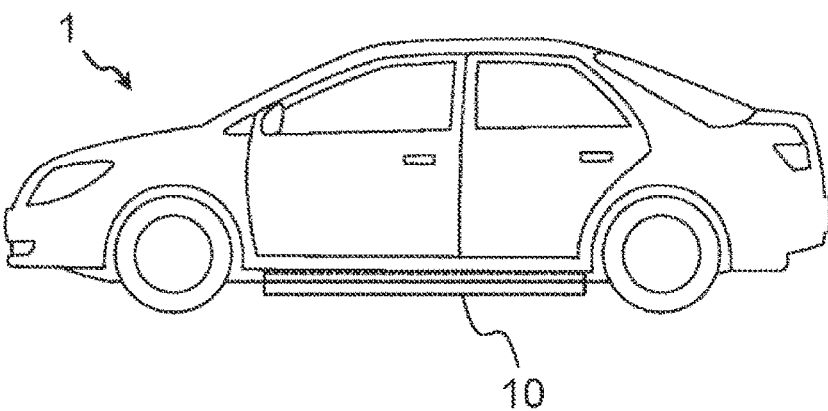

FIG. 1 is a diagram for explaining an example of a vehicle 1 according to an embodiment. As shown in FIG. 1, the direction of "Fr" corresponds to the front direction of the vehicle 1, and the direction of "UPR" corresponds to the upward direction of the vehicle 1.

The vehicle 1 shown in FIG. 1 is, for example, a battery electric vehicle (BEV). Alternatively, vehicle 1 maybe, for example, a hybrid battery electric vehicle (HEV), a plug-in hybrid battery electric vehicle (PHEV) or a fuel cell electric vehicle (FCEV). Vehicle 1 has a ladder frame structure. However, the vehicle 1 may also be a vehicle that does not have a ladder frame structure, that is, a vehicle that has, for example, a monocoque structure.

A vehicle 1 includes a battery pack 10. The battery pack 10 stores electric power to be supplied to the electric motor that drives the vehicle 1. The battery pack 10 is mounted under the floor of the vehicle 1.

Figure 2:
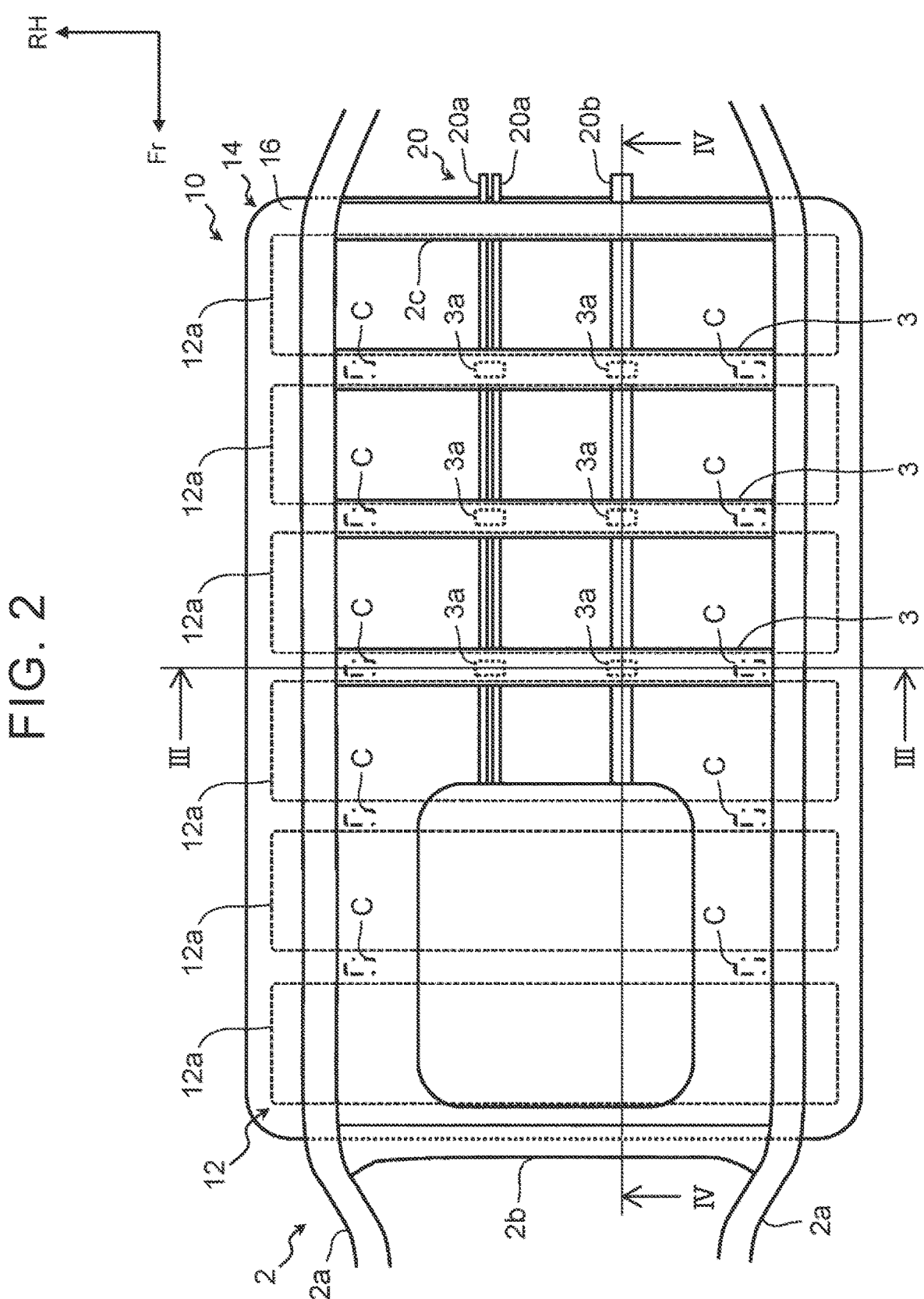
FIG. 2 is a diagram for explaining a basic structure for mounting the battery pack shown in FIG. 1.

FIG. 2 is a diagram for explaining a basic structure for mounting the battery pack 10 shown in FIG. 1. FIG. 2 corresponds to a view of the configuration around the battery pack 10 viewed from above the vehicle 1. As shown in FIG. 2, the direction of "RH" corresponds to the right direction of the vehicle 1.

The battery pack 10 includes a battery 12 and a battery case 14 that houses the battery 12. The battery 12 is, for example, a lithium ion secondary battery. The configuration of battery 12 is not particularly limited. As an example, the battery 12 has a plurality of stacks (battery stacks 12a) of a plurality of battery cells. Inside the battery case 14, a plurality of (for example, six) battery stacks 12a are arranged side by side in the vehicle front-rear direction so as to extend along the vehicle left-right direction. Battery case 14 includes an upper case 16 and a lower case 18 (see FIG. 3).

Moreover, as shown in FIG. 2, the vehicle 1 includes a ladder frame 2. The ladder frame 2 includes a pair of left and right side members 2a corresponding to a main frame, and cross members 2b and 2c corresponding to sub frames. Each of the side members 2a is formed to extend along the longitudinal direction of the vehicle 1. Each of the front cross member 2b and the rear cross member 2c is formed to extend in the lateral direction of the vehicle and is connected to a pair of side members 2a.

Furthermore, the vehicle 1 has one or more frame members 3. As an example, the number of frame members 3 is three. Each frame member 3 is formed to extend along the left-right direction of the vehicle at a position between the front cross member 2b and the rear cross member 2c, and is connected to a pair of side members 2a. Frame member 3 may correspond to a cross member included in ladder frame 2, or may be additionally provided for mounting battery pack 10 thereon.

A body (not shown) of the vehicle 1 is arranged above the ladder frame 2. On the other hand, as shown in FIG. 2, the battery case 14 is arranged below the ladder frame 2 at a position in the longitudinal direction of the vehicle where the cross members 2b and 2c are present. Therefore, the upper case 16 has a portion facing the ladder frame 2 and the frame member 3.

Battery case 14 is attached to vehicle 1 using ladder frame 2. More specifically, the method of attaching the battery case 14 using the ladder frame 2 is not particularly limited. That is, for example, the battery case 14 is fastened at an arbitrary position to the ladder frame 2 or an arbitrary support member (not shown) fixed to the ladder frame 2 using a fastener (for example, a combination of bolts and nuts).

2. Structure Related to Wiring of Wire Harness and Anti-Vibration of Upper Case The vehicle 1 includes various wire harnesses. Some of the wire harnesses are arranged to pass around the battery pack 10 like the wire harness 20 shown in FIG. 2. As an example, one end of the wire harness 20 is connected to a device such as a junction box or an electronic control unit (ECU) housed inside the battery pack 10.

In the vehicle 1, it is required that the wire harness 20 can be arranged and fixed in a limited space. In addition, when the battery pack 10 is mounted under the floor of the vehicle 1, due to the vibration of the upper case 16, the upper case 16 and the parts inside or around the battery pack 10 come into contact with each other, thereby generating a sound or generating a sound. Damage to parts may result. Such anti-vibration measures are also required to be established in a limited space.

Figure 3:
FIG. 3 is a diagram showing a cross section taken along line III-III in FIG. 2.
Figure 4:
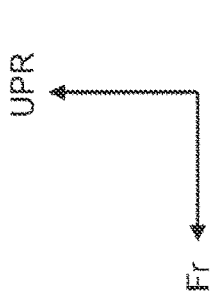
FIG. 4 is a diagram showing a cross section taken along line IV-IV in FIG. 2.
Figure 4:
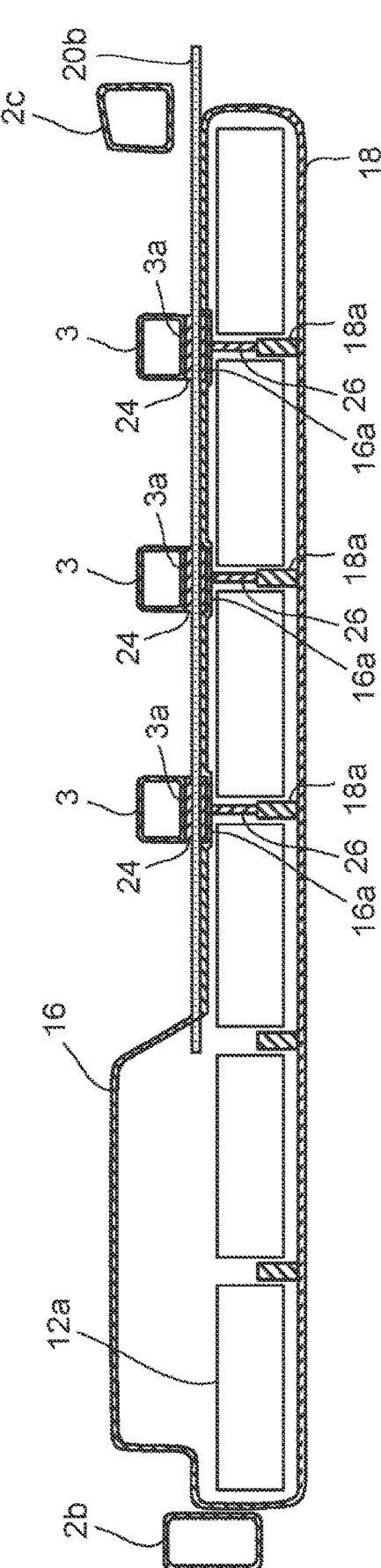

In view of the above-described problems, the vehicle 1 of the present embodiment includes a wire harness routing structure and an upper case vibration isolation structure as described below. FIG. 3 is a diagram showing a cross section taken along line III-III in FIG. 2. FIG. 4 is a diagram showing a cross section taken along line IV-IV in FIG. 2.

As shown in FIG. 3, the upper case 16 includes a first portion (first case-side portion) 16a. The frame member 3 includes a first portion (first frame-side portion) 3a facing the first portion 16a. As an example, the combination of the first portions 16a and 3a is provided at two locations on one frame member 3 as shown in FIG. 3, but may be provided at one location or at three or more locations.

The wire harness 20 is arranged so as to pass through the gap between the first portion 16a and the first portion 3a. In the example shown in FIG. 3, a pair of wire harnesses 20a are disposed so as to pass through the gap between one first portion 16a and the first portion 3a, and one wire harness 20b is disposed so as to pass through the gap between another first portion 16a and the first portion 3a.

A pair of wire harnesses 20a has a covering portion 22. The covering portion 22 is formed of an elastic member (for example, rubber) that covers the outer circumference of each wire harness 20a. The covering portion 22 is in contact with each of the first portion 16a and the first portion 3a, and is sandwiched between the first portion 16a and the first portion 3a. In other words, the covering portion 22 is supported while being compressed by being sandwiched between the first portion 16a and the first portion 3a. The same applies to the other covering portion 24 as well.

More specifically, as shown in FIG. 3, the first portion 16a of the upper case 16 is formed to be recessed inside the upper case 16 compared to the surrounding portions. The first portion 3a of the frame member 3 is formed so as to be recessed inside the frame member 3 compared to the surrounding portions. By having such a cross-sectional shape, the wire harness 20 can be guided into the gap between the first portion 16a and the first portion 3a and can be satisfactorily positioned. Also, the wiring of the wire harness 20 can be established while suppressing the height of the frame member 3 and the battery pack 10 in the vertical direction of the vehicle. Instead of having such a concave shape, the first portion 16a may protrude toward the frame member 3 compared to the surrounding portions, or have both a concave shape and a convex shape. It doesn't have to be. This also applies to the first portion 3a on the frame member 3 side.

Furthermore, the battery case 14 includes a support member 26 (support portion) that supports the first portion 16a of the upper case 16. The support member 26 is disposed between the first portion 16a and the lower case 18. The support member 26 is disposed for each first portion 16a. More specifically, in the example of battery case 14, lower case 18 includes battery cross members 18a formed to extend parallel to battery stacks 12a between adjacent battery stacks 12a. The support member 26 is arranged between the battery cross member 18a and the first portion 16a. More specifically, one end of the support member 26 in the vertical direction of the vehicle is placed on the upper surface of the lower case 18 (battery cross member 18a). The other end of the support member 26 supports the surface opposite to the outer surface of the first portion 16a facing the frame member 3.

Moreover, as already explained, the vehicle 1 is provided with three frame members 3 as an example. Therefore, as shown in FIG. 4, the wiring structure of the wire harness using the first portions 16a and 3a and the anti-vibration structure of the upper case are applied to each of the three frame members 3.

As described above, according to the present embodiment, the wire harness 20 covered by the covering portion 22 or 24 made of an elastic member is disposed so as to be sandwiched between the first portion 16a of the upper case 16 and the first portion 3a of the frame member 3. As a result, the wiring structure of the wire harness and the anti-vibration structure of the upper case can be satisfactorily achieved while saving space.

Also, the first portion 16*a* of the upper case 16 is supported by a support member 26 interposed between the first portion 16*a* and the lower case 18. According to such a support structure, the first portion 16*a* can be pressed against the covering portion 22 or 24 with high rigidity. This contributes to improvement in the anti-vibration effect of the upper case 16.

5A and 5B are diagrams showing other application examples of the wiring structure and the anti-vibration structure according to the embodiment.

Figure 5A:
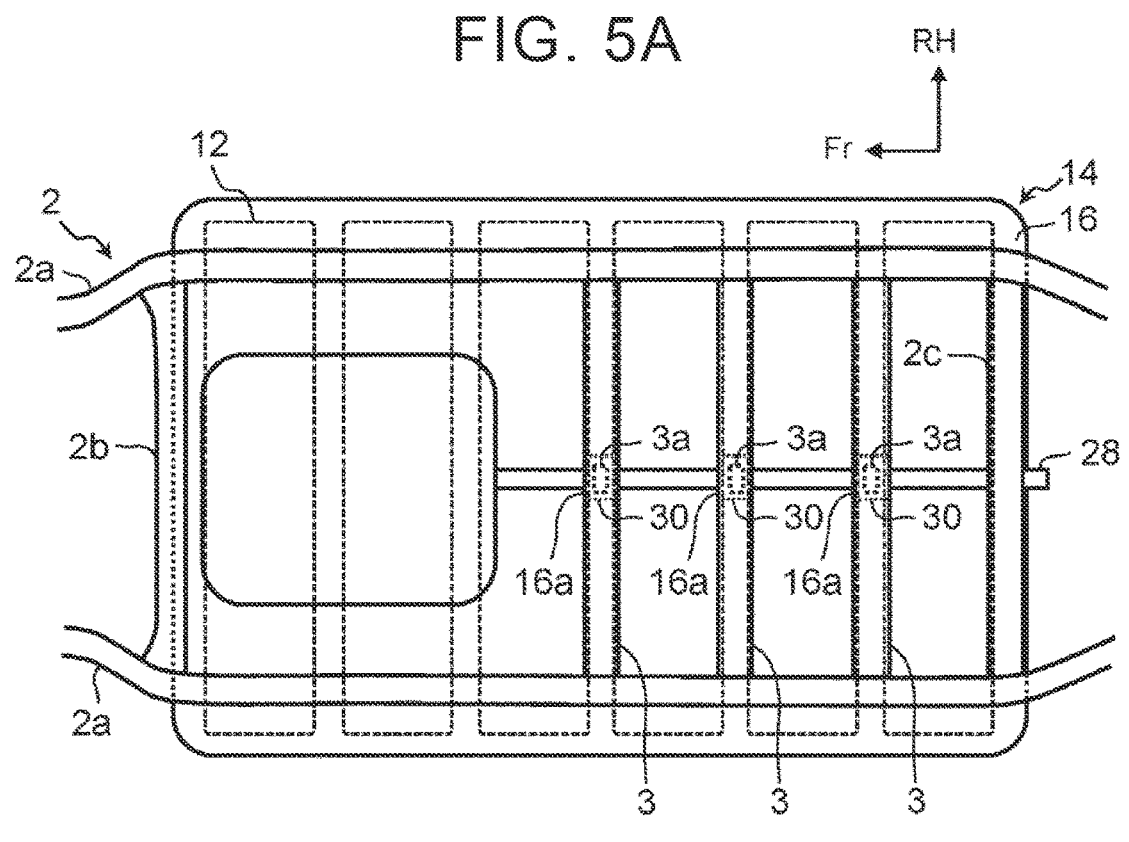
FIG. 5A is a diagram showing another application example of the wiring structure and the vibration isolation structure according to the embodiment.

FIG. 5A shows an example with one wire harness 28 passing around the battery pack 10. In this example, the wire harness 28 extends in the vehicle front-rear direction at the center in the vehicle left-right direction. In this example, in each of the three frame members 3, the wire harness 28 covered by the covering portion 30 formed of an elastic member is disposed so as to be sandwiched between the first portion 16*a* of the upper case 16 and the first portion 3*a* of the frame member 3.

Figure 5B:
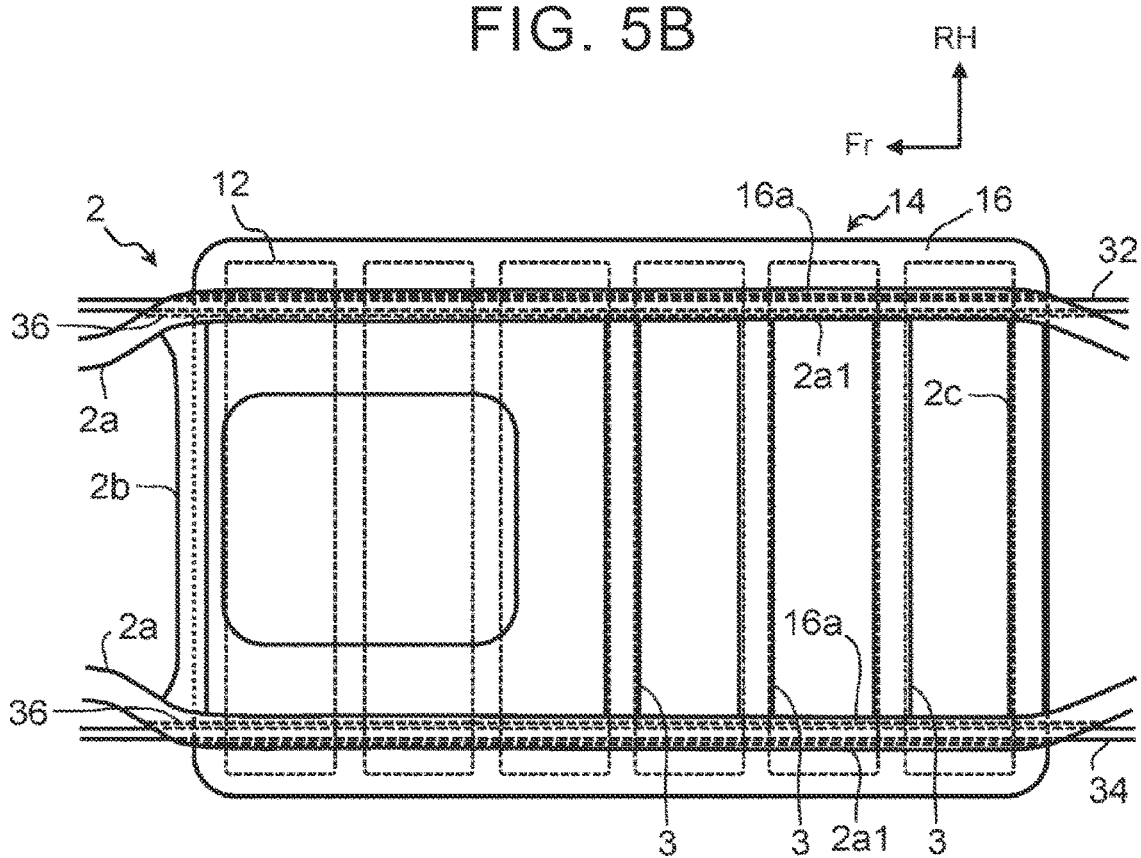
FIG. 5B is a diagram showing another application example of the wiring structure and the anti-vibration structure according to the embodiment.

FIG. 5B shows an example with two wire harnesses 32 and 34 passing around the battery pack 10. The wire harness 32 is disposed to extend in the vehicle front-rear direction along a gap between one side member 2*a* of the ladder frame 2 and the upper case 16. Similarly, the wire harness 34 is arranged along the gap between the other side member 2*a* and the upper case 16 so as to extend in the longitudinal direction of the vehicle.

In the example shown in FIG. 5B, each of the pair of side members 2*a* corresponds to another example of the "frame member" according to the present disclosure. Therefore, in this example, the upper case 16 has a first portion 16*a* at a position facing the side member 2*a*, and the side member 2*a* has a first portion 2*a*1 facing the first portion 16*a*. A wire harness 34 covered with a covering portion 36 made of an elastic member is disposed so as to be sandwiched between the first portion 16*a* and the first portion 2*a*1. For example, the covering portion 36 maybe provided so as to cover the entire first portions 16*a* and 2*a*1 in the vehicle front-rear direction, or may be provided in plurality at predetermined intervals. This also applies to the configuration of the wire harness 34 side.

3. Example With Second Anti-Vibration Structure

In order to further enhance the vibration-damping effect of the upper case, the vehicle 1 is provided with the wire harness wiring structure and the vibration-damping structure of the upper case (here, referred to as "first vibration-damping structure") of the above-described embodiment, and the following "second anti-vibration structure" may also be provided.

Figure 6:
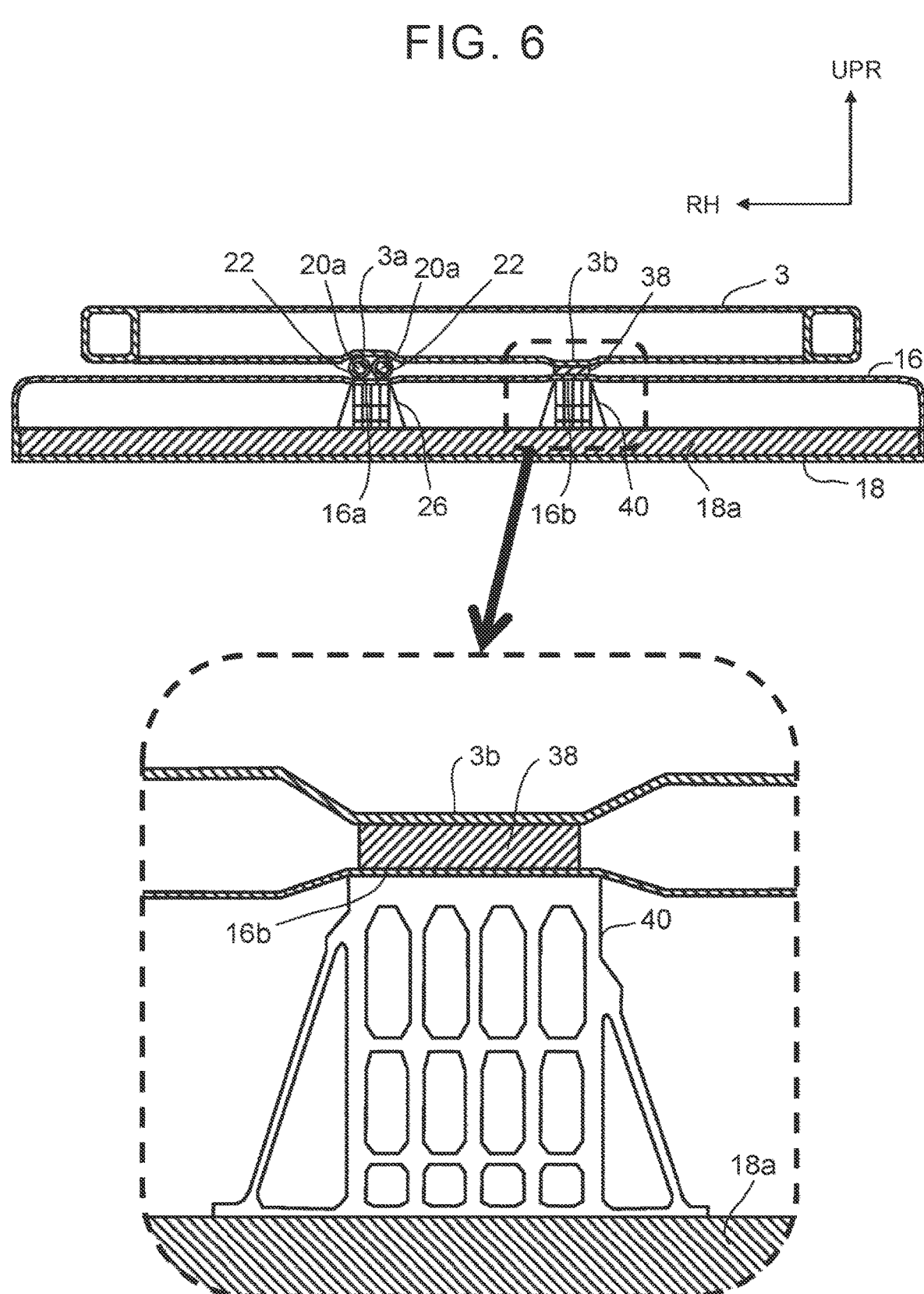
FIG. 6 is a diagram for explaining a second anti-vibration structure according to the embodiment.

FIG. 6 is a diagram for explaining a second anti-vibration structure according to the embodiment. The example shown in FIG. 6 shows a cross section at the same position as in FIG. 3. In this example, the vehicle 1 includes a wiring structure and a first vibration isolation structure for the wire harness 20*a*, and second portions 16*b* and 3*b* and a damper member 38 as a second vibration isolation structure.

As shown in FIG. 6, a second portion (second case-side portion) 16*b* of the upper case 16 protrudes toward the frame member 3 (more specifically, toward the second portion 3*b*) than the surrounding portions. A second portion (second frame-side portion) 3*b* of the frame member 3 faces the second portion 16*b* and protrudes toward the upper case 16 (more specifically, toward the second portion 16*b*) than the surrounding portions. The damper member 38 is made of rubber, for example. The damper member 38 is in contact with each of the second portion 16*b* and the second portion 3*b* and is sandwiched between the second portion 16*b* and the second portion 3*b*. More specifically, the damper member 38 is compressed and supported by being sandwiched between the second portion 16*b* and the second portion 3*b*.

More specifically, in the example shown in FIG. 6, the battery case 14 includes a support member 40 (second support portion) that supports the second portion 16*b* of the upper case 16. Support member 40 is arranged between second portion 16*b* and lower case 18 (e.g., battery cross member 18*a*). Thus, the second portion 16*b* is supported by a support member 40 (second support portion) different from the support member 26 (first support portion) that supports the first portion 16*a*. More specifically, like the support member 26, one end of the support member 40 in the vertical direction of the vehicle is placed on the upper surface of the lower case 18 (battery cross member 18*a*). The other end of the support member 40 supports the surface opposite to the outer surface of the second portion 16*b* facing the frame member 3. According to the support structure using the support member 40, the second portion 16*b* can be pressed against the damper member 38 with high rigidity. This also contributes to the improvement of the anti-vibration effect of the upper case 16.

According to the second vibration isolation structure described above, the damper member 38 is sandwiched between the second portion 16*b* and the second portion 3*b* that protrude toward each other. This makes it possible to suppress the vibration of the upper case 16 more effectively while suppressing the interference between the frame member 3 and the upper case 16 when the vehicle 1 collides.

The point that interference between the frame member 3 and the upper case 16 can be suppressed at the time of collision is supplemented as follows. Unlike the above configuration, if the second portion 3*b* is recessed toward the frame member 3, the gap between the second portion 16*b* where the damper member 38 is arranged and the second portion 3*b* is large. In order to make the height appropriate, it is necessary to make the second portion 16*b* protrude greatly toward the frame member 3 side. As a result, the second portion 16*b* becomes close to the portion of the frame member 3 positioned around the second portion 3*b*. As a result, interference between the frame member 3 and the upper case 16 is likely to occur when, for example, an input is applied to the frame member 3 from the lateral direction of the vehicle at the time of collision of the vehicle 1. On the other hand, according to the configuration shown in FIG. 6, it becomes easier to suppress such interference.

Further, in the example shown in FIG. 6, the first support portion (support member 26), which is one of the plurality of support portions (support members 26 and 40), is used for the wiring structure of the wire harness and the first vibration isolation. A second support portion (support member 40), which is the other of the plurality of support portions, is used for a second vibration isolation structure. According to such a structure, it is possible to achieve both space saving and suppression of interference between members (between the frame member 3 and the upper case 16).

Additionally, in the example shown in FIG. 6, the combination of the wiring structure and the first vibration isolation structure and the second vibration isolation structure are applied to the same frame member 3. Instead of such an example, the second vibration isolation structure may be applied to a frame member 3 other than the frame member 3 to which the combination of the wiring structure and the first vibration isolation structure is applied.

Also, the second anti-vibration structure described above may be applied to other positions of the frame member 3 and the upper case 16 (for example, a plurality of portions C represented by dashed lines in FIG. 2).

What is claimed is:

1. A vehicle comprising:
a battery case that includes an upper case and a lower case and that houses a battery;
a frame member that faces the upper case; and
a wire harness, wherein
the upper case includes a case surface that faces the frame member and a case-surface recessed portion that is formed in the case surface,
the frame member includes a frame surface that faces the case surface and a frame-surface recessed portion that is formed in the frame surface,
the wire harness is disposed so as to pass through a gap between the case-surface recessed portion and the frame-surface recessed portion, and includes a covering portion made of an elastic member that covers an outer circumference of the wire harness, and
the covering portion is in contact with the case-surface recessed portion and the frame-surface recessed portion, and is sandwiched between the case-surface recessed portion and the frame-surface recessed portion.

2. The vehicle according to claim 1, further comprising a damper member, wherein:
the upper case further includes a case-surface protruding portion that is formed as a protruding portion in the case surface that protrudes toward the frame member;
the frame member further includes a frame-surface protruding portion that is formed as a protruding portion in the frame surface that protrudes toward the upper case; and
the damper member is in contact with each of the case-surface protruding portion and the frame-surface protruding portion, and is sandwiched between the case-surface protruding portion and the frame-surface protruding portion.

3. The vehicle according to claim 2, wherein:
the battery case includes a plurality of support portions that is disposed between the upper case and the lower case and that supports the upper case; and
the support portions include
a first support portion that supports the case-surface recessed portion, and
a second support portion that supports the case-surface protruding portion, unlike the first support portion.

* * * * *